United States Patent [19]

Usui et al.

[11] Patent Number: 5,720,628
[45] Date of Patent: Feb. 24, 1998

[54] POWER CONVERTER WITH COMPACT CORD STORGE

[75] Inventors: Hideyuki Usui, Chigasaki; Toshitsugu Mito, Atsugi; Tomoyuki Takahashi, Fujisawa, all of Japan

[73] Assignee: International Business Machines Corporation, Armonk, N.Y.

[21] Appl. No.: 572,263

[22] Filed: Dec. 13, 1995

[30] Foreign Application Priority Data

Dec. 13, 1994 [JP] Japan .................................. 6-308533

[51] Int. Cl.$^6$ .................................................. H01R 11/00
[52] U.S. Cl. ............................ 439/502; 439/501; 439/956
[58] Field of Search .................................. 439/171, 170, 439/172, 501, 502, 956

[56] References Cited

U.S. PATENT DOCUMENTS

| | | | |
|---|---|---|---|
| 4,067,526 | 1/1978 | Storer | 439/501 |
| 5,071,367 | 12/1991 | Luu | 439/501 |
| 5,507,667 | 4/1996 | Hahn et al. | 439/501 |

*Primary Examiner*—Neil Abrams
*Assistant Examiner*—T. C. Patel
*Attorney, Agent, or Firm*—George E. Grosser

[57] ABSTRACT

A portable electronic tool comprising a body for the portable electronic tool; a cable; and an engaging mechanism, so that the cable is stored while the cable is wound by the engaging mechanism around the external surface of the electronic tool body. A first and a second protrusion are provided at the respective ends of the body and prevent the cable from slipping off the body when the cable is wound around the body. The engaging mechanism includes a terminal tool, which is provided at the distal end of the cable, and a recessed portion, which is provided in the first protrusion, wherein the terminal tool is retained. A guide member is provided to guide, in a direction in which the cable is wound, the base end portion of the cable so as to prevent the base end of the cable from being projected outward from the body when the cable is wound around the body. The terminal tool is so designed that selective attachment of various types of plugs is possible.

2 Claims, 6 Drawing Sheets

POWER CONVERTER WITH COMPACT CORD STORGE

The present invention relates to a portable electronic tool, such as an electronic tool for a personal computer, and in particular to an AC/DC adaptor, which is a power supply source for a notebook type personal computer that is constructed to be highly portable.

BACKGROUND OF THE INVENTION

Conventionally, portability is not demanded for AC/DC adaptors and is not especially made much of. As a result, there are no AC/DC adaptors that provide adequate means for the storage of DC cables, and those AC/DC adaptors that are available are not portable. No special consideration has been given to the construction of portable AC/DC adaptors that are to be for use with, for example, notebook type personal computers. The common assumption has been that if spare batteries are carried with such computers when they are transported, AC/DC adaptors are not required. In actuality, however, users frequently carry AC/DC adaptors along with notebook type personal computers, especially on long business trips. But the cable storage problem isn't unique to AC/DC adaptors; portable cassette recorders and radios, for example, have also not been designed to incorporate a simple storage structure for their earphone cables.

Conventional AC/DC adaptors are not so designed that they can be connected to DC plugs that have various shapes, and thus can be connected to only one or two types of personal computers.

SUMMARY OF THE INVENTION

According to the present invention, a portable electronic tool comprises: a body for the portable electronic tool; a cable, which is connected at its base end to the body; and an engaging mechanism for detachably engaging the distal end of the cable to the body, so that when the distal end of the cable is engaged to the body, by the engaging mechanism, and the cable is wound around the external surface of the electronic tool body, the cable can be easily retained.

According to one aspect of the present invention, a first and a second protrusion are provided at the respective ends of the body and prevent the cable from slipping off the body when the cable is wound around the body.

According to another aspect of the present invention, the engaging mechanism includes a terminal tool, which is provided at the distal end of the cable, and a recessed portion, which is provided in the first protrusion, wherein the terminal tool is retained when the distal end of the cable engages the body, to provide a configuration for the portable electronic tool that is more appropriate for carrying.

According to an additional aspect of the present invention, a guide member is provided to guide, in a direction in which the cable is wound, the base end portion of the cable so as to prevent the base end of the cable from being projected outward from the body when the cable is wound around the body, and to thus achieve a structure that is more appropriate for carrying.

According to a further aspect of the present invention, the terminal tool is so designed that selective attachment of various types of plugs is possible.

Hence, the present invention to provides a portable electronic tool that facilitates the storage of a cable, etc.

The present invention also provides an AC/DC adaptor with which various shaped DC plugs can be used in order to cope with various types of personal computers.

BRIEF DESCRIPTION OF THE DRAWINGS

Other objects and advantages of the invention will be apparent to those skilled in the art from the following description taken in conjunction with the accompanying drawings wherein.

DESCRIPTION OF THE PRESENTLY PREFERRED EMBODIMENTS

The present invention will now be described in detail while referring to the accompanying drawings.

Figure 1:
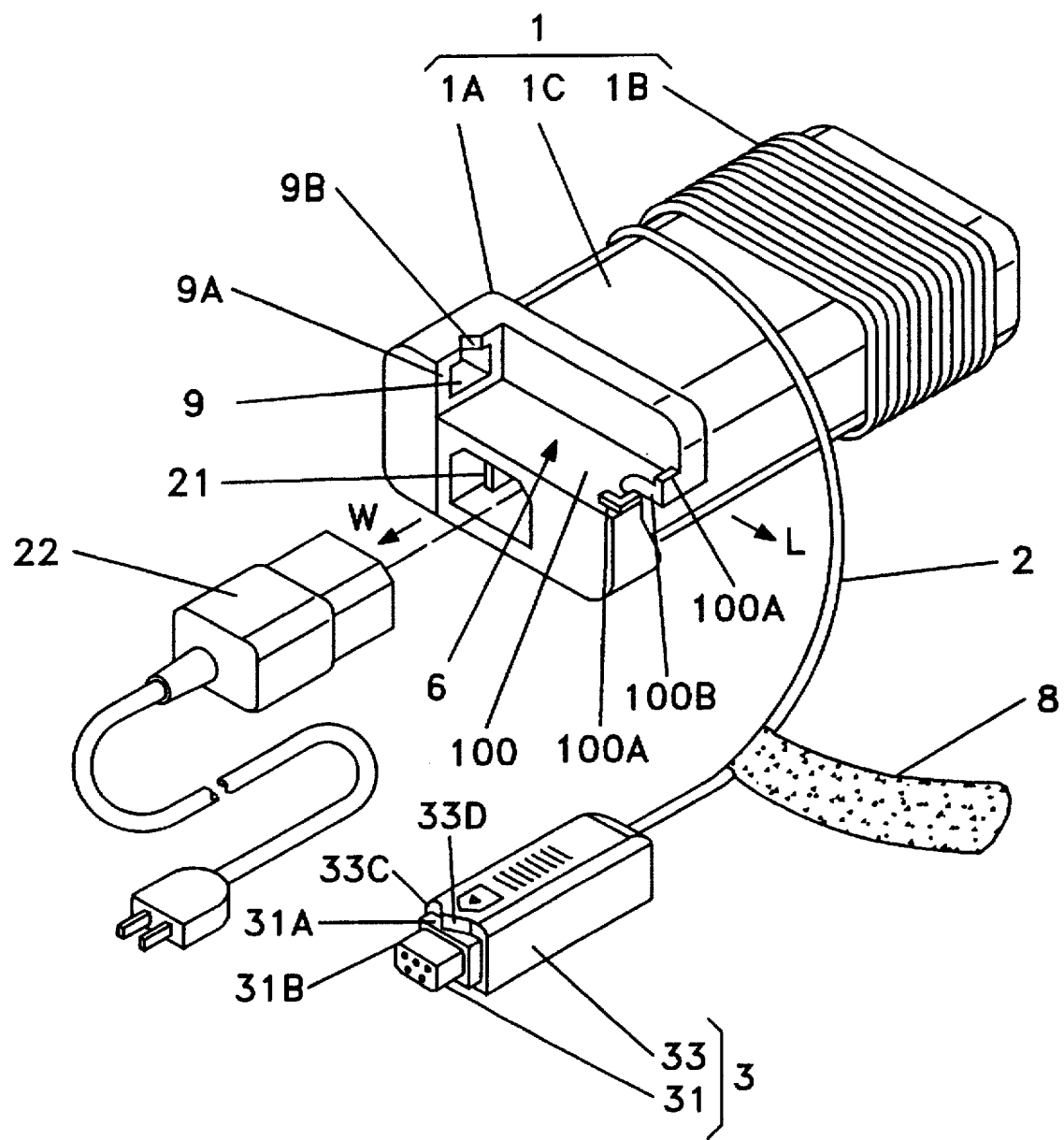
FIG. 1 is a schematic diagram illustrating one embodiment where a portable electronic tool according to the present invention is applied to an AC/DC adaptor.

FIG. 1 is a diagram illustrating a portable electronic tool according to one embodiment of the present invention. The illustrated portable electronic tool is an AC/DC adaptor. The AC/DC adaptor has a body 1 that is shaped almost like a flat box. A first flange 1A, which is as a first protrusion, and a second flange 1B, which is a second protrusion, are provided at the respective ends of the body 1. The body 1 has a circumferential portion 1C between the flanges 1A and 1B. The flanges 1A and 1B have a greater height and width than does the circumferential portion 1C.

The AC/DC adaptor has a DC cable 2. The base end of the DC cable 2 is fixed to the body 1, adjacent to the second flange 1B (also see FIG. 4), and a DC terminal that serves as a terminal tool is attached to the DC cable 2. The DC cable 2 can be wound around the circumferential portion 1C, while the flanges 1A and 1B can prevent the DC cable 2 from slipping off the circumferential portion 1C.

Figure 2:
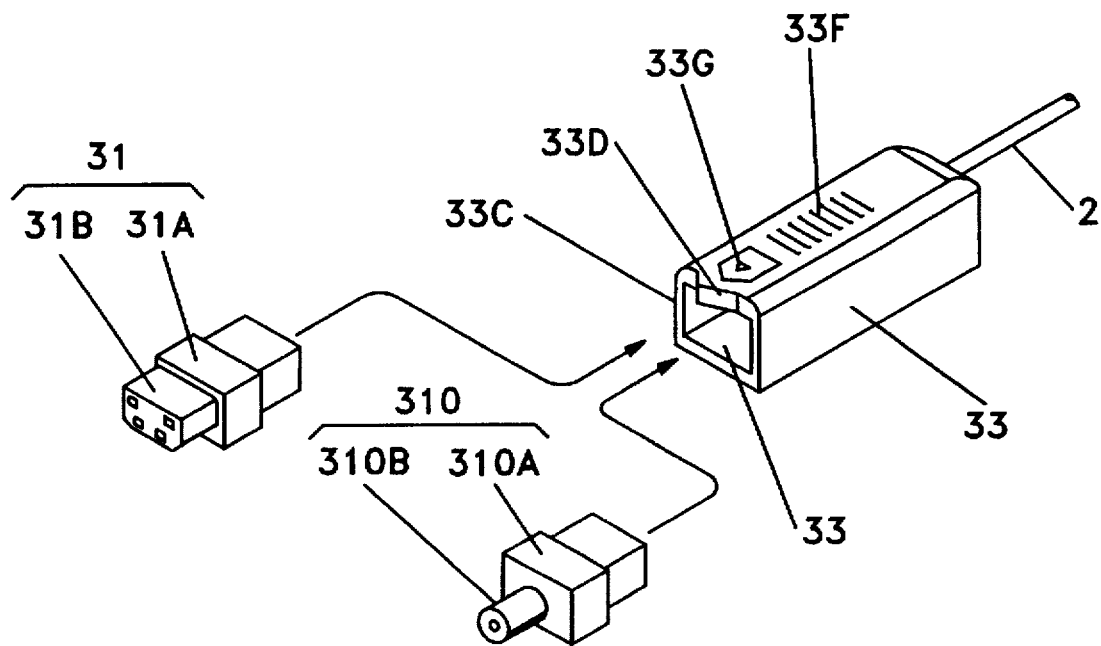
FIG. 2 is a schematic diagram illustrating a DC terminal according to the embodiment.

As is shown in FIG. 2, the DC terminal 3 includes a DC connector socket 33 and a DC plug 31. The cable 2 is fixed to the base end of the DC connector socket 33, while a receptacle 33A is formed in the other, distal end of the DC connector socket 33. A body 31A of the DC plug 31 is inserted into and can be removed from the receptacle 33A. When the body 31A of the DC plug 31 is inserted into the receptacle 33A so that the DC plug 31 is held within the DC connector socket 33, the entire distal plug end 31B and part of the body 31A of the DC plug 31 project outward from the receptacle 33A (see FIG. 1), and the distal plug end 31B and the cable 2 are electrically connected to each other by an electrical connection means (not shown). A non-slip grip portion 33F and an arrow 33G are formed in the top surface of the DC connector socket 33.

A DC plug 310 that differs in shape from the DC plug 31 can be inserted into the DC connector socket 33. While the body 310A of the second DC plug 310 is so formed that it has the same shape as that of the body 31A of the first DC plug 31, the distal plug end 310B of the DC plug 310 is shaped differently from that of the distal plug end 31B of the first DC plug 31. Therefore, by inserting the DC plug 310 a different type of notebook personal computer (not shown) can be accommodated.

Figure 6:
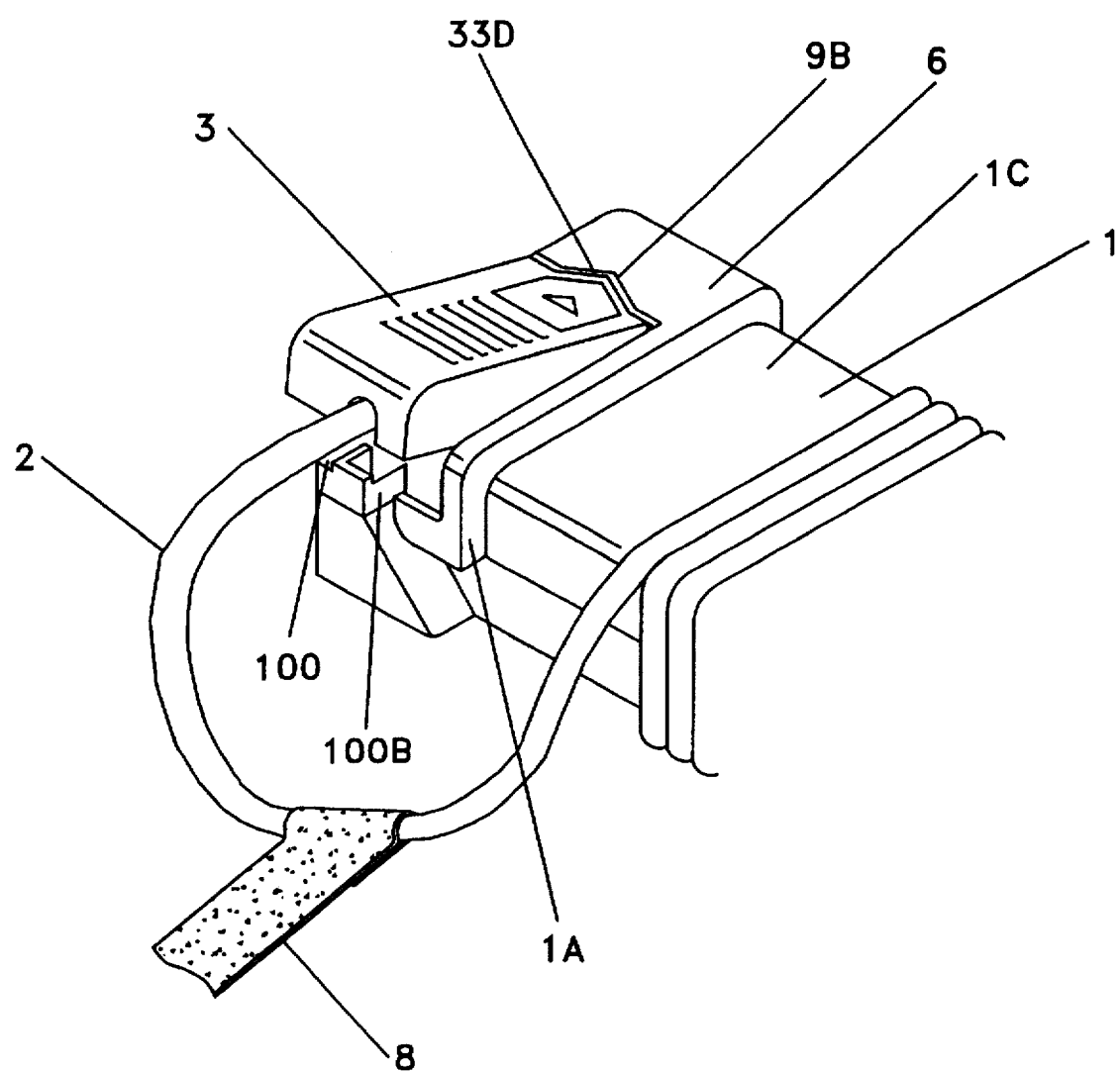
FIG. 6 is a diagram showing the manner in which retention of the cable is accomplished according to the embodiment.

As is shown in FIG. 1, an engaging mechanism 6 comprises the DC terminal 3 at the distal end of the DC cable 2 and a recessed portion 100 in the first flange 1A. The recessed portion 100 is so formed by notching one side of the first flange 1A that the DC connector socket 33 of the DC terminal can be retained in the recessed portion 100. A window 9, which communicates with the recessed portion 100, is formed in the first flange 1A in the longitudinal direction of the recessed portion 100 (indicated by the arrow L in FIG. 1). To store the DC connector socket 33 in the recessed portion 100, the distal plug end 31B is first inserted into the window 9 and then the DC connector socket 33 is slipped into the recessed portion 100. The procedures for this will be described later while referring to FIG. 6.

Figure 3:
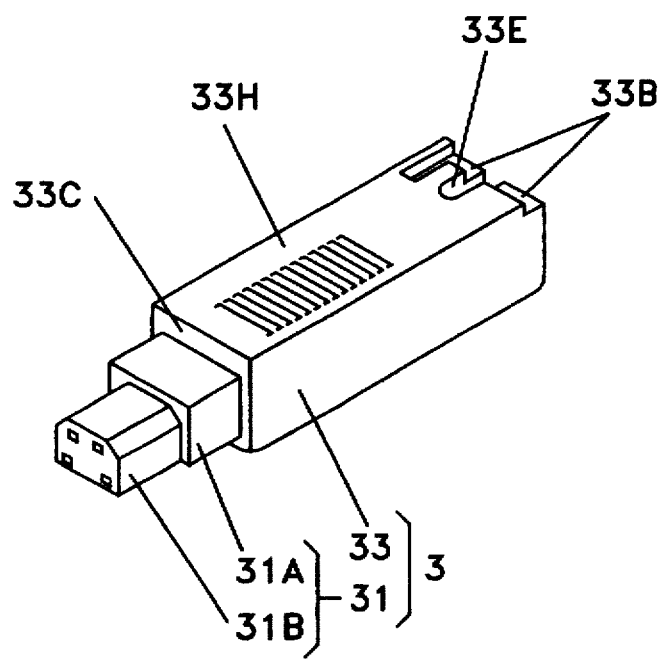
FIG. 3 is a bottom view of the DC terminal of the embodiment.

Protruding stoppers 100A are formed at the opposite end of the recessed portion 100 from the window 9, and as is shown in FIG. 3, recesses 33B for the stoppers 100A are formed at the bottom of the DC connector socket 33 in the end that is opposite to the receptacle 33A (see FIG. 1). When the DC connector socket 33 is stored in the recessed portion 100, the stoppers 100A engage the recesses 33B and an distal end 33C of the DC connector socket 33 contacts a peripheral edge 9A of the window 9. Therefore, the DC connector socket 33 which is sandwiched between the peripheral edge 9A and the stoppers 100A, is held in the recessed portion 100. The parts of the stoppers 100A, and the corresponding parts of the recesses 33B are formed in an L shape, so that the DC connector socket 33 can not only be prevented from slipping out of the recessed portion 100 in the longitudinal direction (which is indicated by the arrow L in FIG. 1) but also in the lateral direction (which is indicated by the arrow W in FIG. 1).

In FIG. 1, a V-shaped notch 9B is formed in the upper external edge 9A of the window 9. A V-shaped protrusion 33D, which corresponds to the V-shaped notch 9B, is formed on the DC connector socket 33. When the DC terminal 3 is fully stored in the recessed portion 100, the V-shaped protrusion 33D engages the V-shaped notch 9B (see FIG. 7). The provision of the V-shaped notch 9B and the V-shaped protrusion 33D makes it easy for the DC terminal 3 to be inserted into and removed from the storage portion (recessed portion) 100. This will be also explained later.

Figure 9:
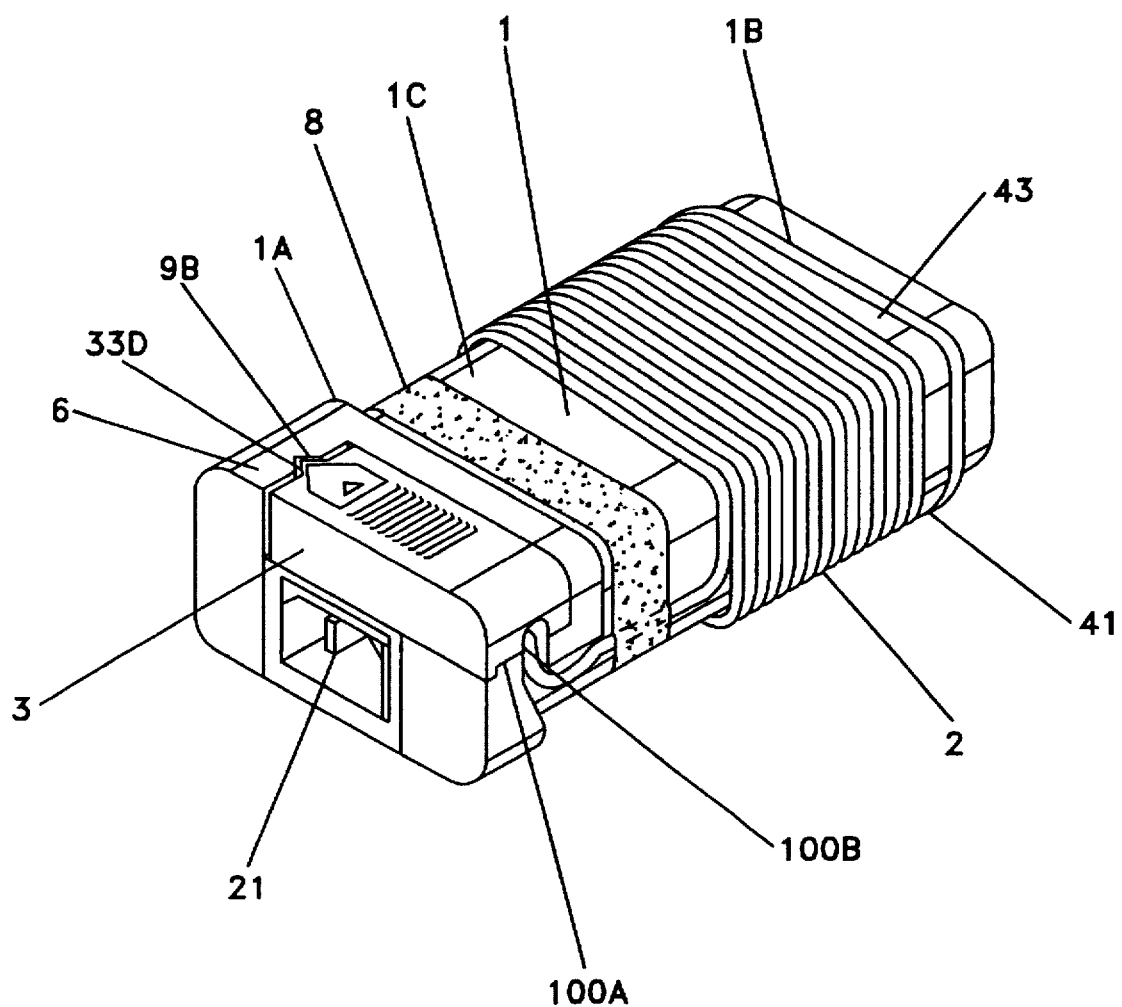
FIG. 9 is a schematic diagram showing an AC/DC adaptor after the storage of the cable has been completed according to the embodiment.

As is shown in FIG. 3, a slot 33E is formed in the base end of the DC connector socket 33 to guide the DC cable 2 (not shown in FIG. 3) that is connected to the base end downward to the bottom 33H of the DC connector socket 33. The DC cable 2 that has been guided downward to the bottom 33H can then be guided into a groove 100B, which is formed in the end of the recessed portion 100. The groove 100B in the recessed portion 100 communicates with the circumferential portion 1C. When the DC terminal 3 is stored in the recessed portion 100, the DC cable 2, which extends from the DC terminal 3, can continue to be wound around the circumferential portion 1C without projecting outward from the DC terminal 3 and the flange 1A. As is shown in FIG. 9, therefore, when the DC terminal 3 is stored in the recessed portion 100, i.e., when it engages the recessed portion 100, no part of it extends beyond the surfaces of the flange 1A, i.e., outward from the body 1, and the AC/DC adaptor is highly portable.

An AC cable plug 21 that is positioned within the flange 1A is provided for the attachment of an AC cable 22. A velcro tape 8 is provided around the portion of the DC cable 2 that is nearer to the DC terminal 3.

Figure 4:
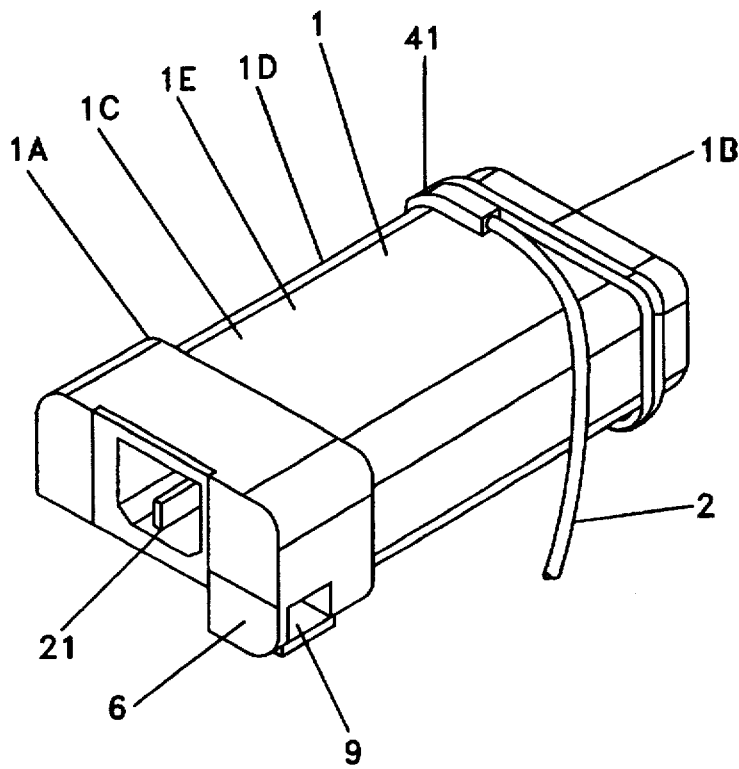
FIG. 4 is a top view of a peripheral mechanism and the body in the embodiment.

FIG. 4 is a diagram showing the manner in which the DC cable 2 is installed on the body 1. In FIG. 4, the base end of the DC cable 2 is connected to the body 1 via an L-shaped rubber piece 41 that constitutes a guiding mechanism. The L-shaped rubber piece 41 is attached to a narrow side portion 1D of the circumferential portion 1C and the distal end of the L-shaped rubber piece 41 extends toward a wide side portion 1E along the circumferential portion 1C. The base end of the DC cable 2 is guided along the circumferential portion 1C by the L-shaped rubber piece 41, and will not project outward from the body 1 when the DC cable 2 is wound around the body 1. The portability of the AC/DC adaptor is increased.

Figure 5:
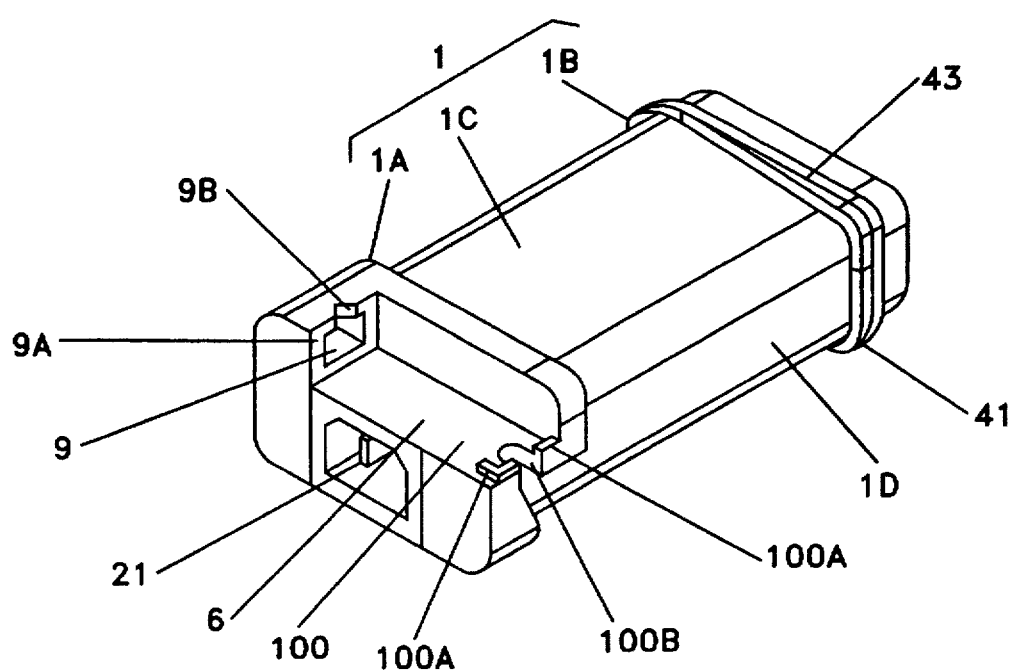
FIG. 5 is a bottom view of the peripheral mechanism and the body in the embodiment.

FIG. 5 is a diagram showing a projected cable guide 43. The projected cable guide 43 is employed for guiding the DC cable 2, after it emerges from the L-shaped rubber piece 41, away from the L-shaped rubber piece 41 and toward the first flange 1A after the DC cable 2 has been wound around the circumferential portion 1C one time. FIGS. 6 through 9 shows the procedures for storing the DC cable 2 and the DC connecter terminal 3 on the body 1. When the length of DC cable 2 that is to be wound around the circumferential portion 1C is shorter than the distance for one turn around the circumferential portion 1C, the DC plug 31 of the DC terminal 3 is inserted into the window 9 of the body 1 (see FIG. 6). At this time, the V-shaped protrusion 33D that is formed on the DC connector socket 33 should engage the V-shaped notch 9B that is formed in the peripheral edge 9A at the top of the window 9. The formation of the V-shaped notch 9B and the V-shaped protrusion 33D permits the DC plug 31 at the distal end of the DC terminal 3 to be inserted into the window 9 even while the DC terminal 3 on the DC cable side is slightly elevated, and the DC terminal 3 can be easily inserted to, and removed from the storage portion (recessed portion) 100.

Figure 7:
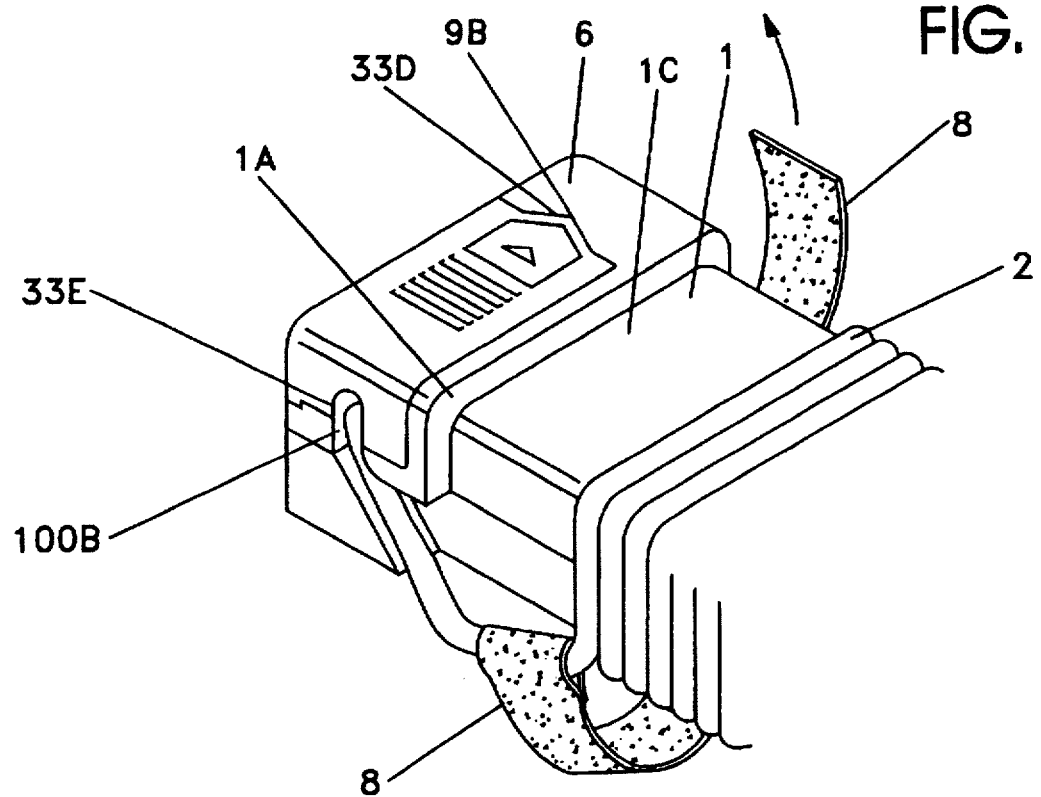
FIG. 7 is a diagram showing the manner in which retention of the cable is accomplished according to the embodiment.

Then, the storage of the DC terminal 3 is completed (see FIG. 7). The V-shaped protrusion 33D is retained in the V-shaped notch 9B, and the DC terminal 3 is fully stored in the recessed portion 100. At this time, the DC cable 2 is guided through the slot 33E, which is formed in the base end of the DC connector socket 33, toward the bottom 33H of the DC connector socket 33. The DC cable 2 that is guided toward the bottom 33H is further guided along the groove 100B that is formed in the side of the recessed portion 100 and communicates with the circumferential portion 1C. Therefore, when the DC terminal 3 is stored in the recessed portion 100, the DC cable 2, which descends from the DC terminal 3, does not project outward from the DC terminal 3 and the flange 1A and can continue to be wound around the circumferential portion 1C. As a result, when the DC terminal 3 is stored in, i.e., engages the recessed portion 100, as is shown in FIG. 7, the DC terminal 3 does not project outward from the flange 1A, i.e., from the body 1.

Figure 8:
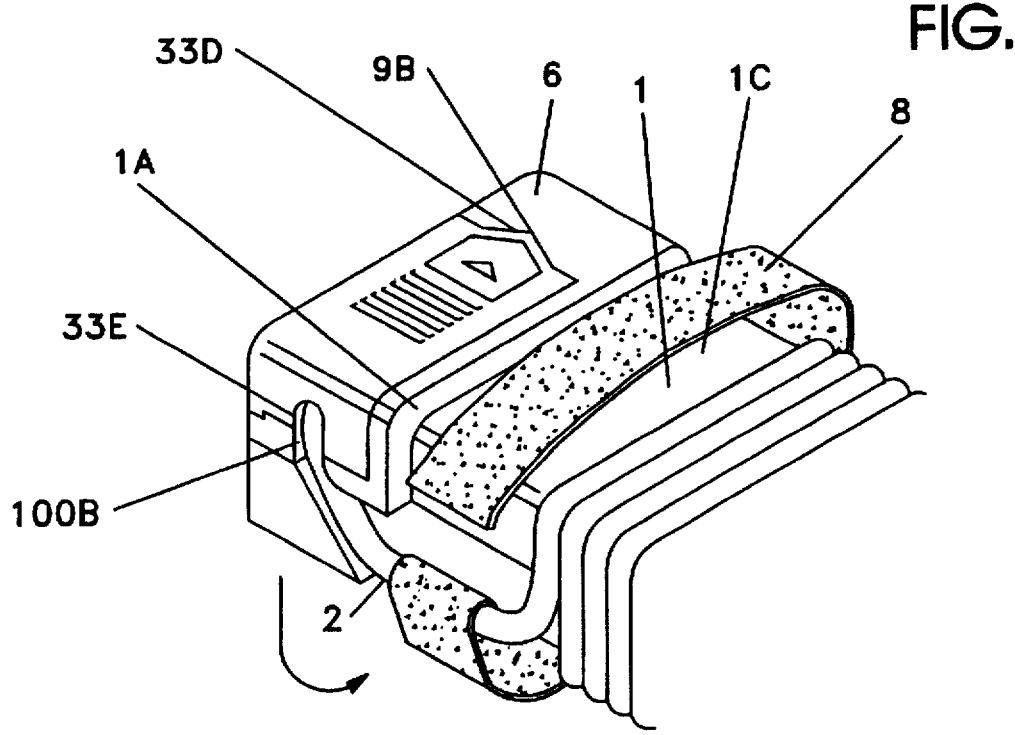
FIG. 8 is a diagram showing the manner in which retention of the cable is accomplished according to the embodiment.

The remaining part of the DC cable 2 is fixed to the body 1 at the circumferential portion 1C by using the velcro tape 8 (see FIGS. 7 and 8). The part of the DC cable 2 that has been guided downward by the groove 100B, and the part of the DC cable 2 that is wound around the circumferential portion 1C are pulled across the circumferential portion 1C by the velcro tape 8 (see FIG. 7). The velcro tape 8 is wound around the circumferential portion 1C and securely fixes the DC cable 2 and prevents any deflection. The state where the DC cable 2 has been completely stored around the body 1 is shown in FIG. 9.

Although in the above embodiment, the flanges 1A and 1B are entirely provided as protrusions in the circumferential direction of the body 1, they may be only partly provided as protrusions in the circumferential direction. Although the DC terminal 3 serves as one component of the first flange 1A, the application of the present invention is not limited to this arrangement. Further, the structure of the engaging mechanism 6 is not limited to that of the above embodiment, and may be any structure that provides for the distal end of a cable to be detachably engaged with a body.

Although an explanation was given for an AC/DC adaptor in this embodiment, the present invention is widely applicable for other portable tools that employ cables, such as earphones for portable CD players and cassette recorders.

What is claimed is:

1. A power converter comprising:

a converter apparatus;

a housing enclosing the converter apparatus which housing is generally in the shape of a rectangular box with a long dimension extending between two ends;

a cord connected to the converter apparatus and extending from one of the housing ends to terminate in a receptacle;

said housing having a central portion located between said ends by flange portions arranged at the respective ends having greater dimensions in directions perpendicular to said long dimension than said central portion;

a receptacle recess being defined in the flange portion at the end opposite the end from which the cord extends, which receptacle recess is defined by walls which releasably retain said receptacle, whereby said cord may be wrapped around the central portion with the receptacle fitted into said receptacle recess to achieve compact and protective cord storage.

2. A power converter according to claim 1 wherein a strap is attached to said cord toward the end having the receptacle whereby the strap may be wrapped around the recessed portion of the housing to apply tension to hold the cord in place in the central portion.

* * * * *